(12) United States Patent
McCully et al.

(10) Patent No.: US 7,584,836 B2
(45) Date of Patent: Sep. 8, 2009

(54) POSITIVE OPERATING COMBINE UNLOADER DISCHARGE DOOR ARRANGEMENT

(75) Inventors: William McCully, New Holland, PA (US); William L. Cooksey, Geneseo, IL (US); Steven M. Wardlow, Milan, IL (US); Orlin W. Johnson, Geneseo, IL (US)

(73) Assignee: CNH America LLC, New Holland, PA (US)

( * ) Notice: Subject to any disclaimer, the term of this patent is extended or adjusted under 35 U.S.C. 154(b) by 378 days.

(21) Appl. No.: 11/643,364

(22) Filed: Dec. 20, 2006

(65) Prior Publication Data

US 2008/0149463 A1 Jun. 26, 2008

(51) Int. Cl.
*B60P 1/40* (2006.01)
(52) U.S. Cl. .................... 198/671; 198/536; 198/550.1; 198/550.4; 198/531; 460/114; 56/16.6
(58) Field of Classification Search ................. 198/531, 198/532, 536, 550.4, 671; 56/16.6; 460/114
See application file for complete search history.

(56) References Cited

U.S. PATENT DOCUMENTS

| 2,625,001 | A | * | 1/1953 | Heun | 56/473.5 |
| 2,818,163 | A | * | 12/1957 | Hilblom et al. | 198/536 |
| 3,031,064 | A | * | 4/1962 | Kline | 198/359 |
| 3,722,715 | A | * | 3/1973 | Young | 414/292 |
| 4,540,086 | A | * | 9/1985 | David et al. | 198/536 |
| 5,348,138 | A | * | 9/1994 | Seemann | 198/671 |
| 6,497,546 | B2 | * | 12/2002 | Wood et al. | 414/523 |
| 6,691,861 | B2 | | 2/2004 | Reimer et al. | 198/534 |
| 2007/0163859 | A1 | * | 7/2007 | Noble et al. | 198/671 |

* cited by examiner

*Primary Examiner*—Mark A Deuble
(74) *Attorney, Agent, or Firm*—Michael G. Harms; J. William Stader; Patrick M. Sheldrake

(57) ABSTRACT

A positive operating combine unloading discharge door which operates independent of the presence of grain in the unloading tube and is attached to the unloading tube to minimize opposition and obstruction to grain flow and completely cover the open end of the unloading tube when the unloading cycle is complete to minimize or eliminate grain loss due to grain dribble.

11 Claims, 5 Drawing Sheets

POSITIVE OPERATING COMBINE UNLOADER DISCHARGE DOOR ARRANGEMENT

TECHNICAL FIELD

This invention relates generally to an agricultural harvesting machine unloading discharge system, and more particularly, to an unloading discharge door arrangement which is positively controlled for opening and closing independent of grain presence or unloading auger operation, and which can be configured to provide a cohesive discharge stream of grain which is less susceptible to wind drift and other problems.

BACKGROUND ART

The unloading tube on a combine harvester is comprised of a cylindrical housing, which encloses an auger. This tube is pivotally attached to the combine so as to allow it to swing out to a deployed operational position substantially normal to the direction of travel and extending upwardly for unloading, and swing into a more level, stowed position supported by its saddle, so as to extend rearwardly substantially parallel to the direction of travel the remainder of the time. The enclosed auger has helical flighting that when the auger is rotated causes grain to move generally longitudinally through the unloading tube. The discharge end of the tube is fitted with a discharge spout. As grain exits the spout, it falls to a separate vehicle for transport.

Typically the unloading tube has a discharge outlet in connection with the discharge spout and an associated dribble door biased toward a closed position partially covering the discharge outlet. During operation of the auger, if present in sufficient quantity, the grain will be pushed by the auger against the dribble door to push the door open. However, when only a small amount of grain is present, which is inadequate to force the door open, this grain will only press against the closed door.

A problem that can arise with usage of a spring loaded dribble door is that this grain remaining in the unloading tube is susceptible to discharge and loss at inappropriate times. For instance, the grain can slosh out over the top of the door, or it can force the door open, such as when the unloading tube is in the more level stowed position even with the auger not operating. This can occur, for instance as a result of a sudden acceleration of the combine or when traversing rough terrain, ditches and the like, and can leave a quantity or strip of grain on the ground.

Another problem that can occur when using a spring loaded dribble door is that, by design, the spring will oppose the opening of the door and the discharge of grain. When smaller or irregular amounts of grain are conveyed by the auger towards the door, the door may only partially open or possibly open by varying amounts as the amount of grain varies. The resulting discharge stream may be irregular and/or varied as influenced by the quantity of grain present making it susceptible to wind drift, which can be generally defined as sideward movement of elements of the downward flow of grain resulting from forces exerted by wind thereagainst. Even small amounts of wind drift can be significant because the grain is often unloaded while the combine is moving while the receiving vehicle is being driven or towed in parallel with the combine over rough terrain or furrows making steering difficult. In instances such as environments such as the plains region of North America, winds can be quite strong and gusty. Often the operator of the receiving vehicle may attempt to position one side or the other of the receiving vehicle more beneath the spout such that, with wind drift, the stream of grain will be directed more to the center of the receiving vehicle. This is facilitated by a tighter, more cohesive discharge stream of grain.

Reference in this regard, Reimer et al., U.S. Pat. No. 6,691,861, which discloses an auger discharge chute with a spring loaded dribble door that has been observed to suffer from at least some of the above problems. The Reimer discharge chute has a dribble door attached to the unloading tube discharge end by a hinge with a spring that biases the door to the upward or closed position. The force of the grain pushes and holds the door open during discharge operations. However, if the amount of grain being conveyed is varied or reduced, for instance, as the grain tank of the combine nears empty, the force generated by the grain against the door may be insufficient to hold the door fully open. This may result in the situation discussed above, such that the grain flow stream is influenced by the position of the door as well as the amount of grain present. Here, using a spring having sufficient force to reduce the amount of grain dribbling out when the auger is not operating, is disadvantageous. To counter the negative effects of the spring loaded door varying in position as a function of the spring force and the amount of grain present, the Reimer door is illustrated to be shortened and shaped as a spout which will likely facilitate grain flow thereover, but the variable position of the door will still have an influence on the flow path of the stream of grain, and additionally the shortened door means that the discharge outlet is not fully covered when the door is in a closed position, such that small amounts of grain can remain in the discharge outlet region of the tube and can urge the door open at inappropriate times as discussed above. Thus, when fully open, the Reimer dribble door may mating engage the chute and be removed from the flow of grain, but in any other position, the door may remain within the grain flow an influences the position, flow path, and other characteristics of the stream of grain.

In addition, it appears from FIGS. 1 and 4 of the Reimer patent that when the unloading door is open, it creates a V shaped groove in which grain can become lodged which may prevent the door from closing properly risking unintentional grain loss.

As another observed shortcoming of some known unloading tube constructions, they may include support ribs or struts which extend through the internal passage of the unloading tube from the wall of the unloading tube transversely through the grain flow region to the endmost bearing supporting the auger, which ribs or struts may be positioned, oriented, and/or of sufficiently large sectional extent perpendicular to the direction of grain flow so as to have the effect of obstructing, splitting or dividing the grain flow to such an extent as to disrupt or split the stream of grain exiting from the discharge outlet, so as to be less cohesive, and thus more susceptible to wind drift and other problems.

Therefore what is sought is a discharge door arrangement for an unloading tube that overcomes one or more of the problems set forth above, including more positive operation to facilitate emptying of grain from the tube, and holding the door closed when the unloading tube is not in use. The arrangement can further include struts supporting the endmost auger bearing oriented to be only minimally obstructive such that a more cohesive stream of grain can be directed to the transport vehicle.

SUMMARY OF THE INVENTION

What is disclosed is an unloading tube discharge system for a combine which overcomes one or more of the problems set forth above including more positive operation to facilitate emptying of grain from the tube, and holding the door closed when the unloading tube is not in use. The arrangement can further include struts supporting the endmost auger bearing oriented to be only minimally obstructive such that a more cohesive stream of grain is achieved.

According to a preferred aspect of the invention, the unloading tube discharge system is used with a cylindrical shaped unloading tube defining an internal passage in connection with a discharge outlet at an end of the tube, a helical auger operable for conveying grain through the internal passage of the tube and discharging the grain through the discharge outlet as a stream of grain along a flow path. The invention includes a door sized and shaped, most preferably, for covering the unloading tube discharge outlet, the door being pivotally attached to the unloading tube adjacent the discharge outlet, so as to be pivotally movable between a closed position covering the discharge outlet preventing grain loss through inadvertent or unintentional opening and an open position uncovering the discharge outlet. A discharge spout is preferably connected to the tube adjacent to the discharge outlet of the unloading tube. The invention include an actuator in connection with the door and selectively operable for positively moving the door to the open position and to the closed position independent of presence of grain within the internal passage of the tube.

In another preferred aspect of the invention the door is attached to the unloading tube in a manner such that, when moved to the open position the door is located beneath the grain flow path so as not to obstruct, interfere with, influence, or oppose the flow of the stream of grain. An advantage is that the grain stream is not effected by a varying door position resulting in a more cohesive and predictable grain flow. Even when only small amounts of grain are being discharged, such as when the grain tank is nearly empty, smaller amounts of grain that fall onto the door will be carried by the door to its outermost edge, which is more outwardly from the discharge outlet compared to a shorter dribble type door.

As a further aspect of the invention, the cylindrical unloading tube includes a circumferential edge bounding the discharge outlet, the edge including an upper portion and a lower portion, the upper portion extending longitudinally outwardly of the lower portion.

According to yet another a preferred aspect of the invention, the helical auger includes a helical flight extending around an auger shaft supported for rotation about a central longitudinal axis, the flight having an auger surface oriented at an acute angle to the auger shaft, and a bearing supporting the shaft adjacent to the discharge outlet, the bearing being supported by one or more support arms having a thinnest sectional extent in a direction substantially parallel to the auger surface so as to aligned with the direction of grain for to minimize splitting or division of the stream of grain.

Preferred apparatus of the system include, but are not limited to, fluid controlled actuators and electrically powered actuators.

DETAILED DESCRIPTION OF THE INVENTION

Figure 1:
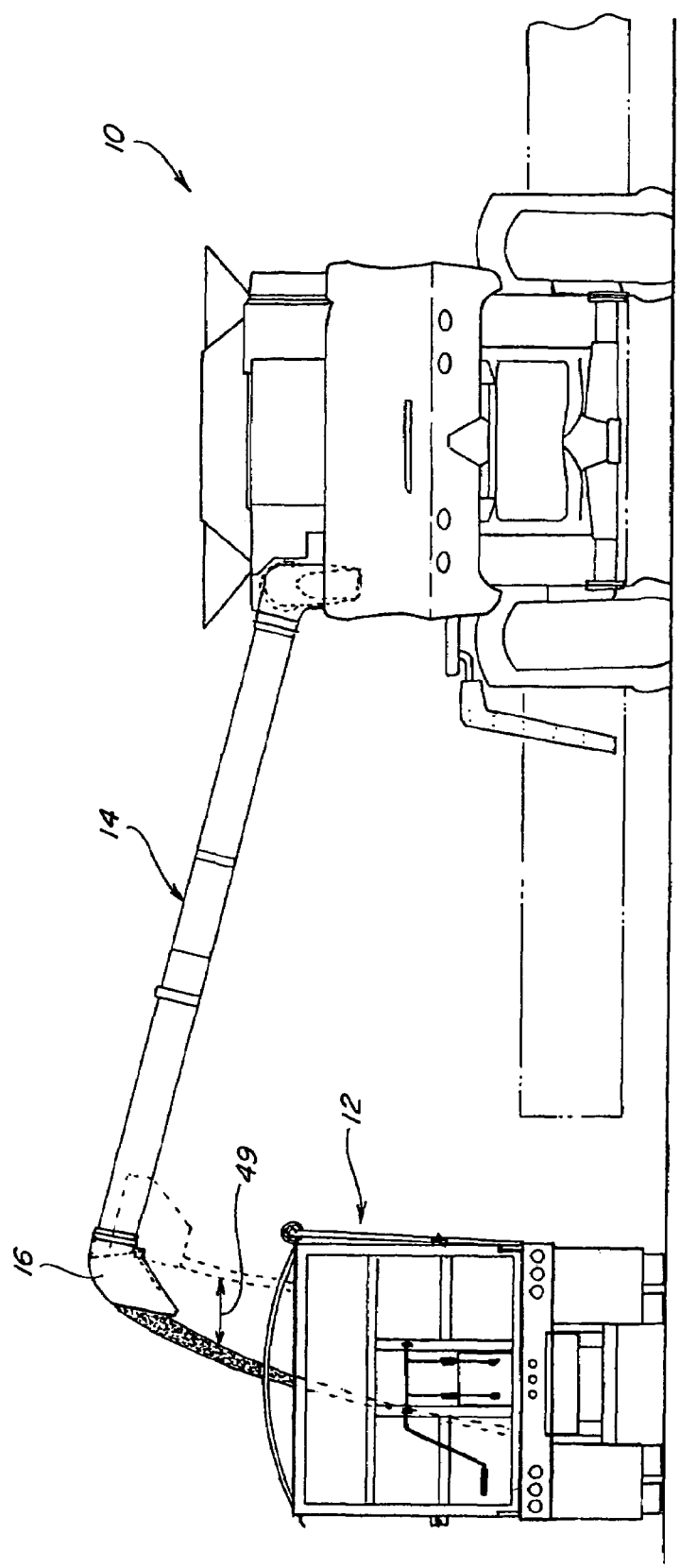
FIG. 1 is a simplified rear view of a combine unloading grain to a transport vehicle.

The invention will be described with reference to FIGS. 1, 2, 3A, 3B, 4, 5, 6A, and 6B wherein like numbers refer to like parts, FIG. 1 shows a rear view of a combine 10 unloading grain to a transport vehicle 12 through a cylindrical shaped unloading tube 14 and a spout 16. Grain is moved from combine 10 through unloading tube 14 by an auger 18 (see FIGS. 3A and 3B) in a well known manner.

Figure 2:
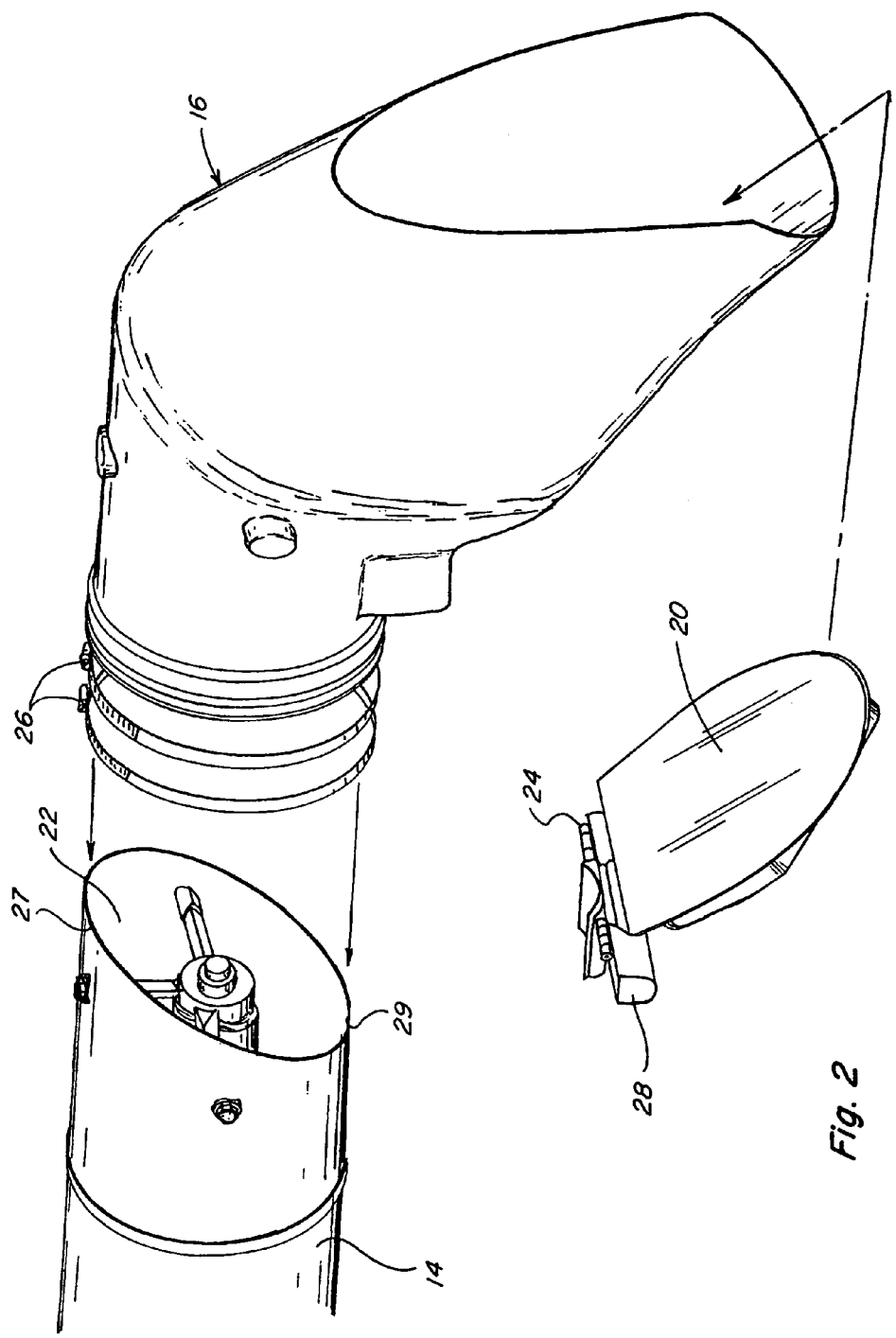
FIG. 2 is a simplified perspective view illustrating a discharge end of an unloading tube of the combine of FIG. 1 with a discharge spout positioned for installation thereon and a discharge door of the present invention.
Figure 3A:
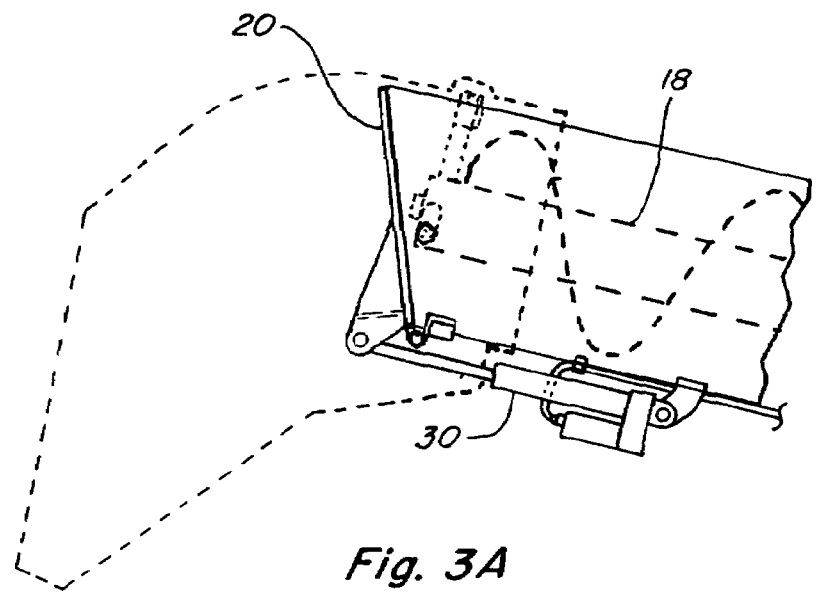
FIG. 3A is a simplified side view of the unloading tube, with discharge door arrangement of the invention installed thereon and illustrated in a positively closed position, with a helical auger within the tube shown in dotted lines along with a discharge spout installed on the discharge tube.
Figure 3B:
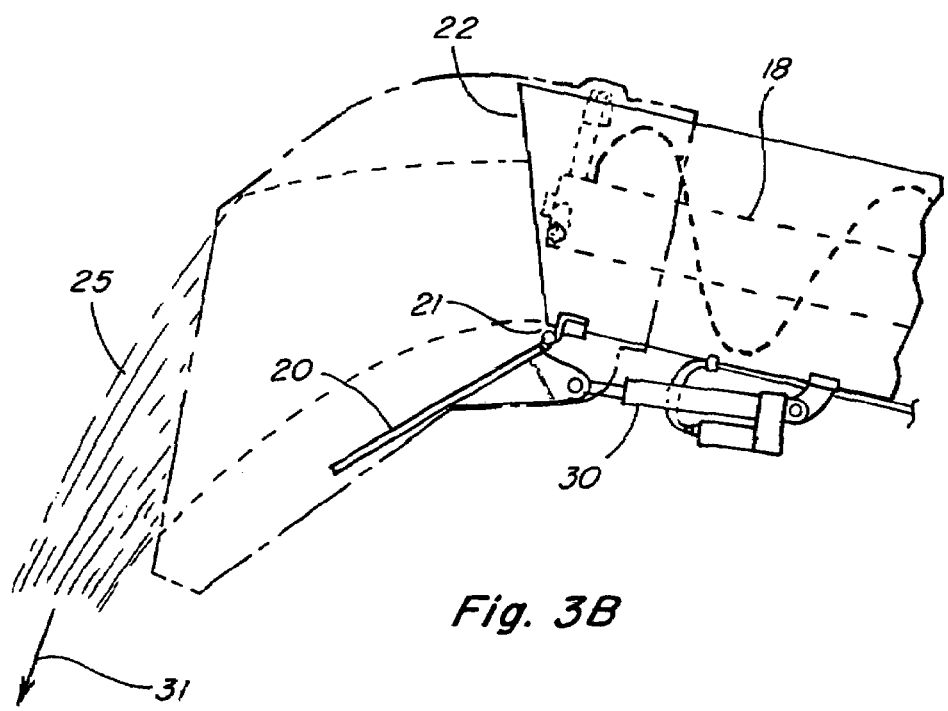
FIG. 3B is a simplified side view of the unloading tube, with discharge door arrangement of the invention illustrated in a positively open position, with the auger and discharge spout illustrated in dotted lines, and a stream of grain being discharged from the discharge outlet and through the spout along a flow path above the open door.

According to the invention, a discharge door 20 sized and shaped to cover discharge outlet 22, is pivotally attached adjacent discharge outlet 22, so as to be pivotally movable from a closed position covering discharge outlet 22 to an open position uncovering discharge outlet 22 as shown in FIGS. 2, 3A, 3B, and 4. Discharge spout 16 may connect to tube 14 adjacent to discharge outlet 22 accommodating door 20 and its attachment to tube 14 as shown in FIG. 2. Spout 16 may be held in place with one or more hose clamps 26 or the like. In a preferred embodiment of the invention, door 20 is mounted for pivotal movement relative to discharge outlet 22 between a closed position (FIG. 3A) and an open position (FIG. 3B), with a hinge 24, or the like, and is positively controlled to the closed and open positions. Preferred apparatus for positively controlling movements of door 20 include, but are not limited to, an electrically powered actuator 28 as shown in FIG. 2 or fluid controlled actuator 30 as shown in FIGS. 3A and 3B. It is important to note that, because of positive control, door 20 may be opened independent of the presence of grain in tube 14. That is, the present invention does not require the force of grain acting against the door to effect opening thereof, or the absence of grain to effect closing thereof.

As seen in FIGS. 2 and 3B, door 20 may be attached on the periphery of unloading tube 14 near discharge outlet 22, so that opening door 20 may create a separation 21 between door 20 and tube 14 at discharge outlet 22. As door 20 closes, grain that may remain on door 20 will discharge through spout 16 or be carried back into tube 14. Because no ledge is created by a connection point between door 20 and tube 14 near discharge outlet 22, it is unlikely that grain will lodge in separation 21 to inhibit the closing of door 20.

When door 20 is in the closed position, it is positively held in that position by actuator 28 30 as shown in FIGS. 2 and 3A, and substantially covers discharge outlet 22 virtually eliminating the possibility of grain dribble or slosh from tube 14. When positively controlled to be in its open position, as shown in FIG. 3B, door 20 uncovers discharge outlet 22 and is positioned outside of a discharging stream of grain 25 along a flow path 31. Also, when door 20 is positively held in its open position, the force created when auger 18 moves grain through unloading tube 14 is not required in any way to open door 20 and therefore is not dissipated by pushing and holding open a spring biased door, as is required in the prior art discussed above. As a result, the grain is allowed to flow unopposed, as if no door was present, such that it is discharged in a cohesive, predictable stream 25 along flow path 31. Although shown attached to tube 14 near outlet 22, it is contemplated according to the invention that door 20 could alternatively be mounted within spout 16 and perform in essentially the same manner.

Another aspect of the invention related to discharge outlet 22 can be seen in FIG. 2. A circumferential edge bounding discharge outlet 22 may be slanted diagonally so that an upper portion 27 of unloading tube 14 extends longitudinally outwardly of a lower portion 29 of tube 14. This arrangement may facilitate attachment of door 20 in the above described manner. In addition, as illustrated in FIG. 1, this arrangement may extend the reach of unloading tube 14 by a distance 49 as upper portion 27 extends further into spout 16 than lower portion 29.

Figure 5:
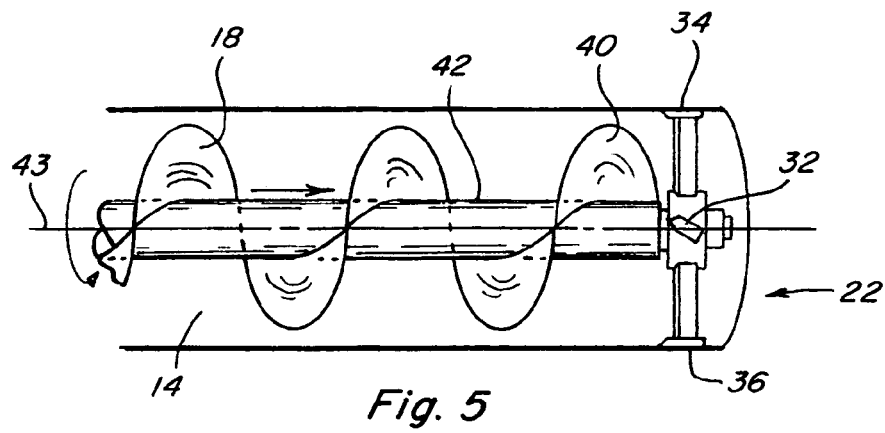
FIG. 5 is a simplified schematic top view of the unloading tube with the top portion thereof removed to show the auger and elements supporting the end of the auger in the tube.

Another feature of the invention that reduces obstruction to grain flow can be seen in a simplified schematic top view of the unloading tube 14 as shown in FIG. 5. Helical auger 18 includes a helical flight 40 having an auger surface 41 extending around an auger shaft 42 which is supported adjacent to discharge outlet 22 for rotation by a bearing (not shown) about a central longitudinal axis 43. The bearing is supported by at least one strut 32, 34, 36 having a thinnest sectional extent 44 in a direction substantially parallel to auger surface 41, which is parallel to the grain flow as shown in FIGS. 5 and 6B for reducing division of grain stream 25.

Figure 6A:
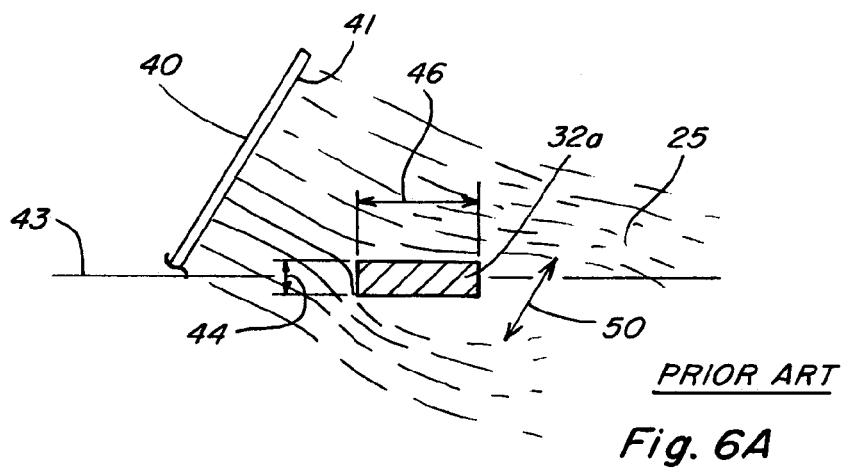
FIG. 6A is a simplified schematic top view of an auger of the unloading tube supported by a prior art strut, illustrating the disruption to a flow of grain conveyed by the auger resulting from the orientation of the strut.
Figure 6B:
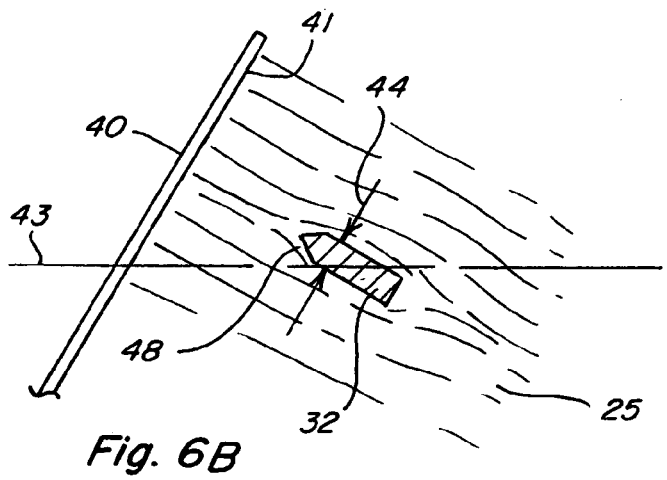
FIG. 6B is a simplified schematic top view of the auger of the unloading tube supported by a strut, illustrating a reduction in the disruption to a flow of grain conveyed by the auger resulting from the orientation of the strut according to the invention.

This effect can be understood with reference to FIGS. 6A and 6B. FIG. 6A shows a typical prior art attaching member 32a situated parallel to longitudinal axis 43 of auger shaft 42. When grain is urged forward by auger surface 41, it approaches a prior art strut 32a at an angle. Discharging grain impacts sectional extents 44 and 46 of strut 32a causing a separation 50 in grain stream 25 which is relatively wide. FIG. 6B shows strut 32 of the present invention situated so that only its thinnest extent 44 is parallel to auger surface 41. In this case, when the grain is urged forward by auger surface 41, strut 32 is generally parallel to grain stream 25 minimizing separation to no more that extent 44 which is smaller than separation 50. Notice also in FIG. 6B, that strut 32 may be narrowed at a leading end 48 to gradually interrupt the discharging grain, possibly resulting in even less separation in grain stream 25. Struts 34, 36 may also be aligned with grain stream 25 in a similar manner. Thus when grain discharges past at least one strut 32, 34, 36, attached in an orientation so as to reduce separation, through discharge outlet 22 without resistance or interference from positively controlled door 20, discharge grain stream 25 may be tighter, stronger and less susceptible to loss due to wind.

Figure 4:
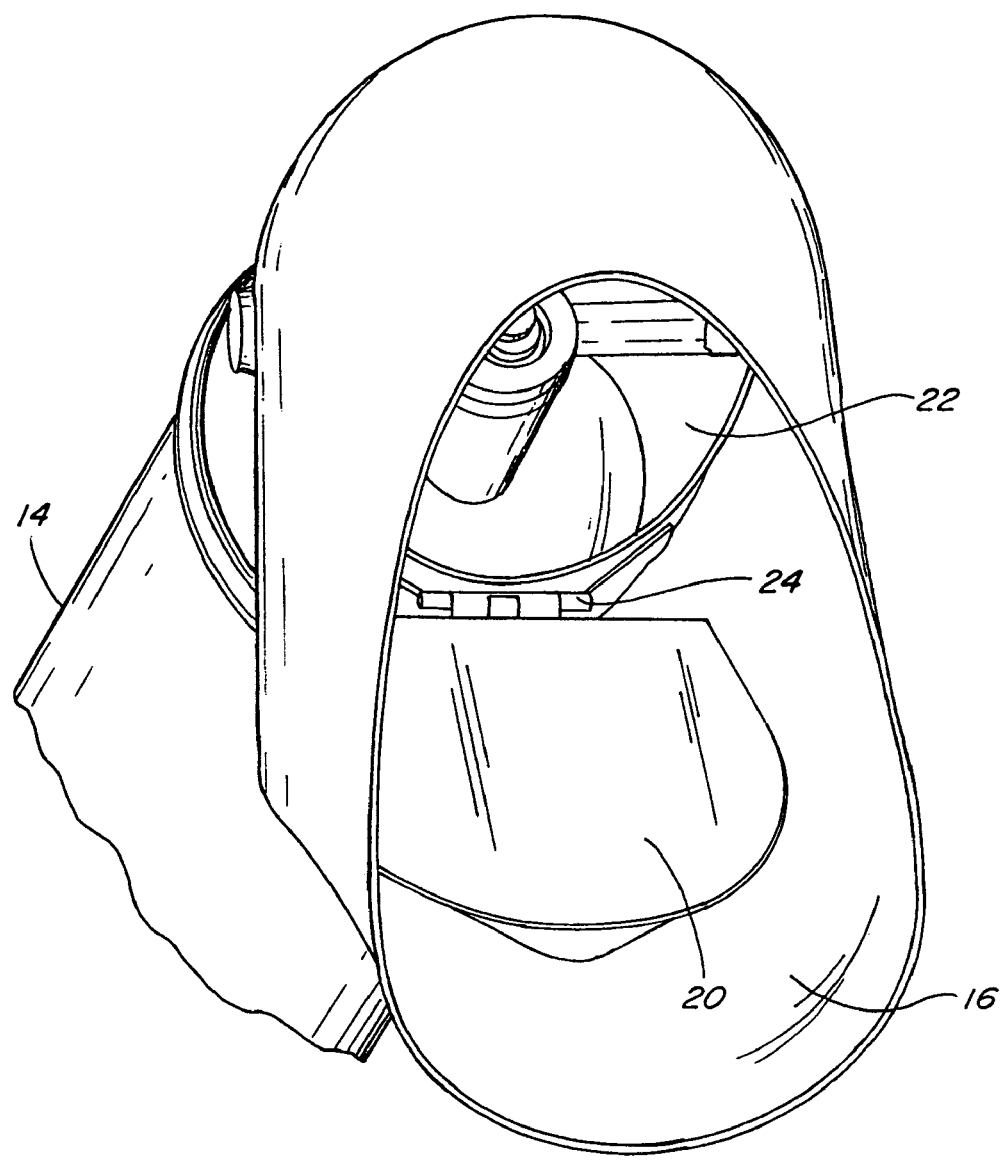
FIG. 4 is a perspective view of the discharge end of the tube looking upwardly through a discharge end of the spout with the discharge door of the invention open to reveal an auger within the unloading tube.

Referring to FIGS. 2, 3B and 4, it should be noted that the bottom region of spout 16 can be shaped to accommodate and receive door 20 when in the open position so as to be located beneath flow path 31, and will have a suitable opening for passage of actuator 28, 30 to door 20. Another advantage of this arrangement, at times when only a minimal amount of grain is being discharged and fall onto door 20, it will be allowed to smoothly transition onto the bottom outer surface of spout 16 and easily exit.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An unloading tube discharge system for an agricultural combine, comprising:
   a cylindrical shaped unloading tube defining an internal passage in connection with a discharge outlet at an end of the tube;
   a helical auger operable for conveying grain through the internal passage of the tube and discharging the grain through the discharge outlet as a stream of grain along a flow path;
   a door sized and shaped for covering the unloading tube discharge outlet, the door being pivotally mounted in connection with the unloading tube adjacent the discharge outlet, so as to be pivotally movable between a closed position covering the discharge outlet and an open position uncovering the discharge outlet, wherein the door is attached to the unloading tube at a location below the flow path such that when moved to the open position the door is located beneath the flow path so as to allow unopposed flow of the stream of grain thereover;
   a discharge spout connected to the tube adjacent to the discharge outlet of the unloading tube; and
   an actuator in connection with the door and selectively operable for positively moving the door to the open position and to the closed position independent of presence of grain within the internal passage of the tube.

2. The unloading tube discharge system of claim 1, wherein the door fully covers the discharge outlet of the unloading tube when in the closed position.

3. The unloading tube discharge system of claim 1, wherein the actuator comprises a fluid controlled actuator.

4. The unloading tube discharge system of claim 1, wherein the actuator comprises an electrically powered actuator.

5. The unloading tube discharge system of claim 1, wherein the cylindrical unloading tube includes a circumferential edge bounding the discharge outlet, the edge including an upper portion and a lower portion, the upper portion extending longitudinally outwardly of the lower portion.

6. The unloading tube discharge system of claim 1, wherein the helical auger includes a helical flight extending around an auger shaft supported far rotation about a central longitudinal axis, the flight having an auger surface oriented at an acute angle to the auger shaft, and a bearing supporting the shaft adjacent to the discharge outlet, the bearing being supported by at least one support arm having a thinnest sectional extent in a direction substantially parallel to the auger surface for reducing division of the stream of grain.

7. An unloading tube structure for a combine, including:
   a hollow tube having an open end connecting with an interior passage through the tube;

an auger supported in the interior passage of the hollow tube and extending to a location adjacent to the open end, and operable for conveying grain along the interior passage and discharging a stream of grain through the open end and along a flow path;

a door pivotally mounted adjacent the open end of the tube, so as to be pivotally movable between a closed position covering the open end and an open position uncovering the open end, wherein when in the open position the door is disposed in spaced relation to the flow path, and to create a separation between the open end and the door when the door is in the open position;

a spout having an inlet end mounted on the tube adjacent the open end so as to house the door, and an open through with the flow path extends for directing the stream of grain flowing from the open end of the tube; and an actuator in connection with the door and operable to selectively move the door between the closed position and the open position.

8. The unloading tube structure of claim 7, wherein the door fully covers the open end when in the closed position.

9. The unloading tube structure of claim 7, wherein the actuator comprises a fluid controlled actuator.

10. The unloading tube structure of claim 7, wherein the actuator comprises an electrically powered actuator.

11. The unloading tube structure of claim 7, wherein the auger is supported by at least one support arm attached to the tube adjacent the open end and which is situated in general alignment with the direction of the stream of grain when flowing in the vicinity of the support arm.

* * * * *